United States Patent [19]
Hashimoto et al.

[11] Patent Number: 5,004,981
[45] Date of Patent: Apr. 2, 1991

[54] DETECTOR DEVICE FOR SIMULTANEOUSLY DETECTING BOTH THE DIRECTION AND NUMBER OF ROTATIONS OF ROTATING MEMBER

[75] Inventors: Toru Hashimoto; Masato Takabatake; Masashi Chino; Akira Takahashi, all of Kyoto, Japan

[73] Assignee: Mitsubishi Jidosha Kogyo Kabushiki Kaisha, Tokyo, Japan

[21] Appl. No.: 434,082

[22] Filed: Nov. 9, 1989

[30] Foreign Application Priority Data

Nov. 18, 1988 [JP] Japan ................................ 63-290242
Nov. 18, 1988 [JP] Japan ................................ 63-290243
Oct. 27, 1989 [JP] Japan ................................ 1-278348

[51] Int. Cl.⁵ ...................... G01B 7/30; G01P 3/487; G05D 13/00; F02D 9/00
[52] U.S. Cl. .............................. 324/207.22; 123/617; 137/47; 318/653; 324/165; 324/174; 324/207.25; 324/207.12; 377/17
[58] Field of Search .......... 324/165, 173, 174, 207.12, 324/207.2, 207.25; 377/17; 73/517 R, 518, 519; 310/156; 318/653; 340/686; 123/617; 137/47

[56] References Cited

U.S. PATENT DOCUMENTS

| | | | |
|---|---|---|---|
| 3,619,680 | 11/1971 | Okamoto | 324/174 X |
| 4,258,324 | 3/1981 | Henrich | 324/207.25 X |
| 4,376,915 | 3/1983 | Penn | 73/519 X |
| 4,490,674 | 12/1984 | Ito | 324/207.25 |
| 4,495,464 | 1/1985 | Kozai et al. | 324/174 |
| 4,499,420 | 2/1985 | Shiraki et al. | 324/174 |
| 4,785,242 | 11/1988 | Vaidya et al. | 324/207.25 |

FOREIGN PATENT DOCUMENTS

0287103  12/1987  Japan ............................. 324/207.2

Primary Examiner—Gerard R. Strecker
Attorney, Agent, or Firm—Frishauf, Holtz, Goodman & Woodward

[57] ABSTRACT

A sensor for detecting a number of revolutions of a rotary shaft is provided which comprises a ring magnet secured to the outer peripheral surface of the rotary shaft, the number of revolutions of which is to be detected, a Hall IC arranged near the outer peripheral surface of the rotary shaft, for detecting the magnetism of the ring magnet. The ring magnet has one circumferential half of the outer peripheral surface thereof magnetized to serve as the north pole and the other circumferential half of the outer peripheral surface thereof magnetized to serve as the south pole.

22 Claims, 7 Drawing Sheets

DETECTOR DEVICE FOR SIMULTANEOUSLY DETECTING BOTH THE DIRECTION AND NUMBER OF ROTATIONS OF ROTATING MEMBER

BACKGROUND OF THE INVENTION

1. Field of the Invention

This invention relates to a sensor for detecting the number of revolutions of a rotating member and to a motor-driven actuator provided with the sensor.

2. Description of the Related Art

Figure 13:
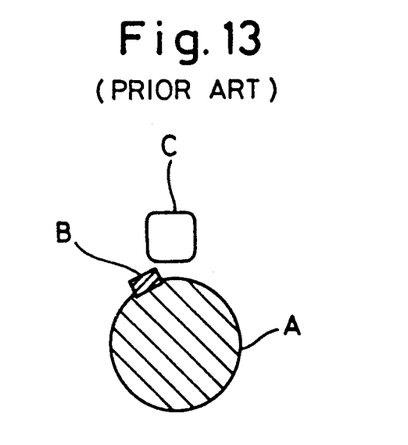
FIG. 13 is a diagram showing a conventional sensor for detecting a number of revolutions.

Sensors of this type are used, for example, to count the number of revolutions of a motor which is driven continuously. Specifically, this type sensor comprises, as shown in FIG. 13, a single magnet B secured to the outer peripheral surface of a rotary shaft A rotated by a motor, and a magnetic probe C arranged near the outer peripheral surface of the rotary shaft A. The magnetic probe C is composed of a Hall IC including a Hall element, for example, and is positioned such that, as the rotary shaft A rotates, the magnet B passes just under the probe C.

Figure 14:
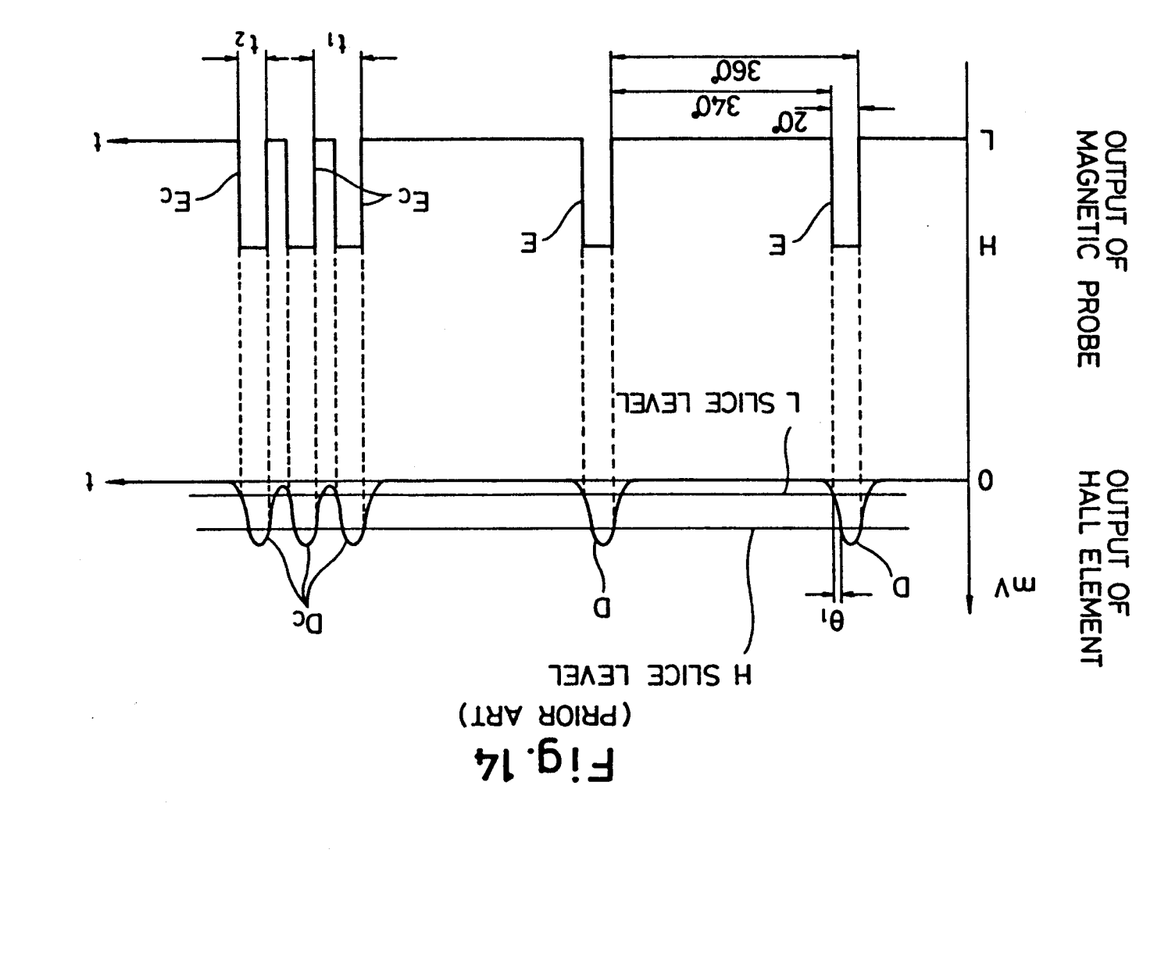
FIG. 14 is a chart showing an output of a Hall element within a Hall IC of FIG. 13 and an output of the Hall IC.

The Hall element of the magnetic probe C outputs an analog voltage signal D, as shown in FIG. 14, upon detecting the magnetism of the magnet B each time the magnet B passes thereby. The voltage signal D is converted into a digital pulse signal within the magnetic probe C. Accordingly, pulse signals E corresponding in number to passages of the magnet B are output from the magnetic probe C. In FIG. 14, two lines parallel to the horizontal axis indicate an H slice level and an L slice level respectively defining the positive going portion and negative going portion of the pulse signal E.

Therefore, by counting the pulse signals E from the magnetic probe C, it is possible to obtain the number of revolutions of the rotary shaft A, i.e., the motor.

The above-mentioned sensor produces pulse signals E corresponding in number to the revolutions of the rotary shaft A while the shaft A is rotated at a predetermined speed. However, in the case in which the power supply to the motor is stopped and thus the rotary shaft A is stopped after being rotated for a time by inertia such that the magnetic probe C and the magnet B are situated relative to each other as shown in FIG. 13, if the rotary shaft A is vibrated or there is looseness in the assembly of the rotary shaft A, voltage signals are continuously output from the Hall element of the magnetic probe C, as indicated at Dc in FIG. 14. Accordingly, the pulse signals are also continuously output from the magnetic probe C, as indicated at Ec. As a result, so-called chattering occurs in the sensor output signal, making it impossible to accurately detect the number of revolutions of the rotary shaft A.

This disadvantage arises from the fact that the use of a single magnet B secured to the rotary shaft A inevitably brings about a small hysteresis angle $\theta_1$ (about 5°), taken in terms of the rotational angle of the rotary shaft A, which is defined by the H and L slice levels in relation to the waveform of the voltage signal D shown in FIG. 14. When the rotary shaft A, i.e., the magnet B, is vibrated over the hysteresis angle $\theta_1$, the aforesaid disadvantage occurs.

To eliminate the erroneous counting of revolutions caused by the above chattering, those pulse signals E whose pulse interval t1 is improbably short may be neglected. Namely, provided that the region occupied by the magnet B is 20° and the other region is 340° in terms of the rotational angle of the rotary shaft A, and that the interval at which the magnetic probe C detects the magnetism of the magnet B, i.e., the interval between H (or L) level signals, is 7 ms at the shortest taking account of the rotational speed of the motor, those signals Ec whose pulse interval is shorter than 7 ms may be filtered out and thus neglected. In this case, to measure the interval t1, the H level period t2 must be actually detected. However, the region of the magnet B in terms of the rotational angle of the rotary shaft A is as small as 20° as mentioned above, and accordingly, the H (or L) level period t2 is very short. It is therefore difficult to detect the H (or L) level period t2 and accordingly to filter out the pulse signals Ec.

Even if the pulse signals Ec can be filtered out in the aforesaid manner, the filtering does not effectively function in the case in which the rotary shaft A is slowly vibrated when the magnet B and the magnetic probe C are located relative to each other as shown in FIG. 13 with the rotary shaft A stopped. In such a case, chattering of the pulse signals cannot be eliminated and the number of revolutions of the rotary shaft A cannot be counted accurately.

This disadvantage is particularly serious when the above sensor for detecting the number of revolutions is used with a motor-driven actuator, wherein the rotary shaft A is rotated forward and reversely by a motor which is driven continuously, and the forward and reverse rotations of the rotary shaft A are converted, for example, to reciprocating motions of the valve member of a valve, i.e., opening and closing motions of the valve, to thereby obtain the valve opening of the valve member based on the number of revolutions of the rotary shaft A. In this case, if chattering occurs in the pulse signals from the sensor, the number of revolutions of the rotary shaft A cannot be counted accurately, and accordingly, the opening of the valve member cannot be controlled with high accuracy.

OBJECTS AND SUMMARY OF THE INVENTION

This invention was made in view of the above circumstances, and a first object thereof is to provide a sensor capable of accurately detecting the number of revolutions of a rotating member with a simple arrangement. A second object of the invention is to provide a motor-driven actuator which can position a driven member with high accuracy by using the sensor, wherein the rotational force of a motor, which is driven continuously, is transmitted to the driven member to effect a reciprocating motion of the driven member.

The first object is achieved by a sensor according to the invention which comprises: a magnet assembly provided with a rotating member and including a ring magnet member secured to an outer peripheral surface of the rotating member and surrounding the same, the ring magnet member having a north pole provided over one circumferential half of the outer peripheral surface thereof and a south pole provided over the other circumferential half of the outer peripheral surface thereof; and magnetism detecting means for outputting a pulse signal in accordance with magnetic force and magnetic property of the magnetic poles of the ring magnet member when the ring magnet member is rotated together with the rotating member, the magnetism detecting means including a magnetic probe for outputting the pulse signal, the magnetic probe being securely arranged near the outer peripheral surface of the rotating member to be always opposed to the outer peripheral surface of the ring magnet member.

The second object of the invention is achieved by a motor-driven actuator according to the invention which comprises: a motor which is driven continuously; a gear train for transmitting rotation of the motor to a driven member by converting the rotation of the motor into reciprocating motion of the driven member; a magnet assembly provided with one of shafts including a rotary shaft contained in the gear train and an output shaft of the motor, and including a ring magnet member secured to an outer peripheral surface of said one of shafts and surrounding the same, the ring magnet member having a north pole provided over one circumferential half of the outer peripheral surface thereof and a south pole provided over the other circumferential half of the outer peripheral surface thereof; and magnetism detecting means for providing a pulse signal in accordance with magnetic force and magnetic property of the magnetic poles of the ring magnet member when the ring magnet member is rotated together with said one of shafts, the magnetism detecting means including a magnetic probe for providing the pulse signal, the magnetic probe being securely arranged near the outer peripheral surface of said one of shafts to be always opposed to the outer peripheral surface of the ring magnet member.

According to the sensor of the invention, one circumferential half of the outer peripheral surface of the ring magnet member serves as the north pole and the other circumferential half of the outer peripheral surface thereof serves as the south pole, whereby, each time the rotating member makes a half rotation, the magnetic polarity detected by the magnetic probe changes alternately. Accordingly, if the magnetic probe comprises a Hall IC as in the above-mentioned case, a Hall element thereof outputs a voltage signal having a sine wave, not a pulse-like waveform as shown in FIG. 14. With such a voltage signal having a sine wave, a large hysteresis angle defined by the H and L slice levels can be ensured. Therefore, even when the boundary between the north and south poles of the ring magnet member is located at the same rotational position as the magnet B is located in FIG. 13, with the rotating member stopped, and the rotating member is vibrated by some reason, the influence of such vibration of the rotating member can be restricted to within the aforesaid range of hysteresis angle. As a result, no chattering occurs in the pulse signal delivered from the magnetic probe, whereby, by using the sensor of the invention, the number of revolutions of the rotating member can be accurately counted based on the pulse signals.

By incorporating the above sensor into a motor-driven actuator, it is possible to accurately count the number of revolutions of a shaft to which the ring magnet member is attached, and accordingly, a driven member which is driven by the motor through a gear train can be positioned with high precision.

In the sensor of the invention, preferably, a pair of ring magnet members are attached to the rotating member such that they are shifted in rotational phase by 90° relative to each other. In this case, it is possible to detect whether the rotating member is rotating in a forward or reverse direction, based on the output signals from magnetic probes associated with the paired ring magnet members.

The above and other objects, features, and advantages of this invention will become more apparent from the ensuing detailed description taken in connection with the accompanying drawings.

DETAILED DESCRIPTION

Figure 1:
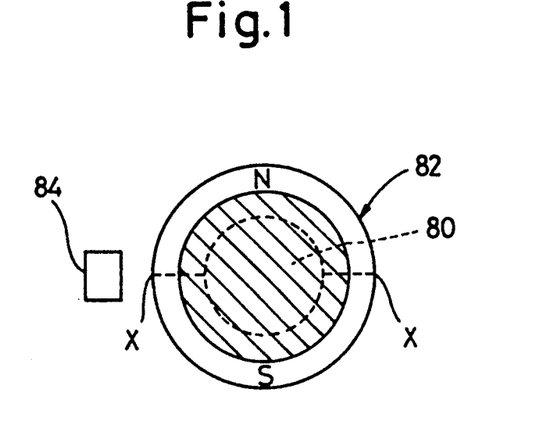
FIG. 1 is a sectional view of a sensor according to one embodiment of the invention, taken along line I—I in FIG. 4.
Figure 2:
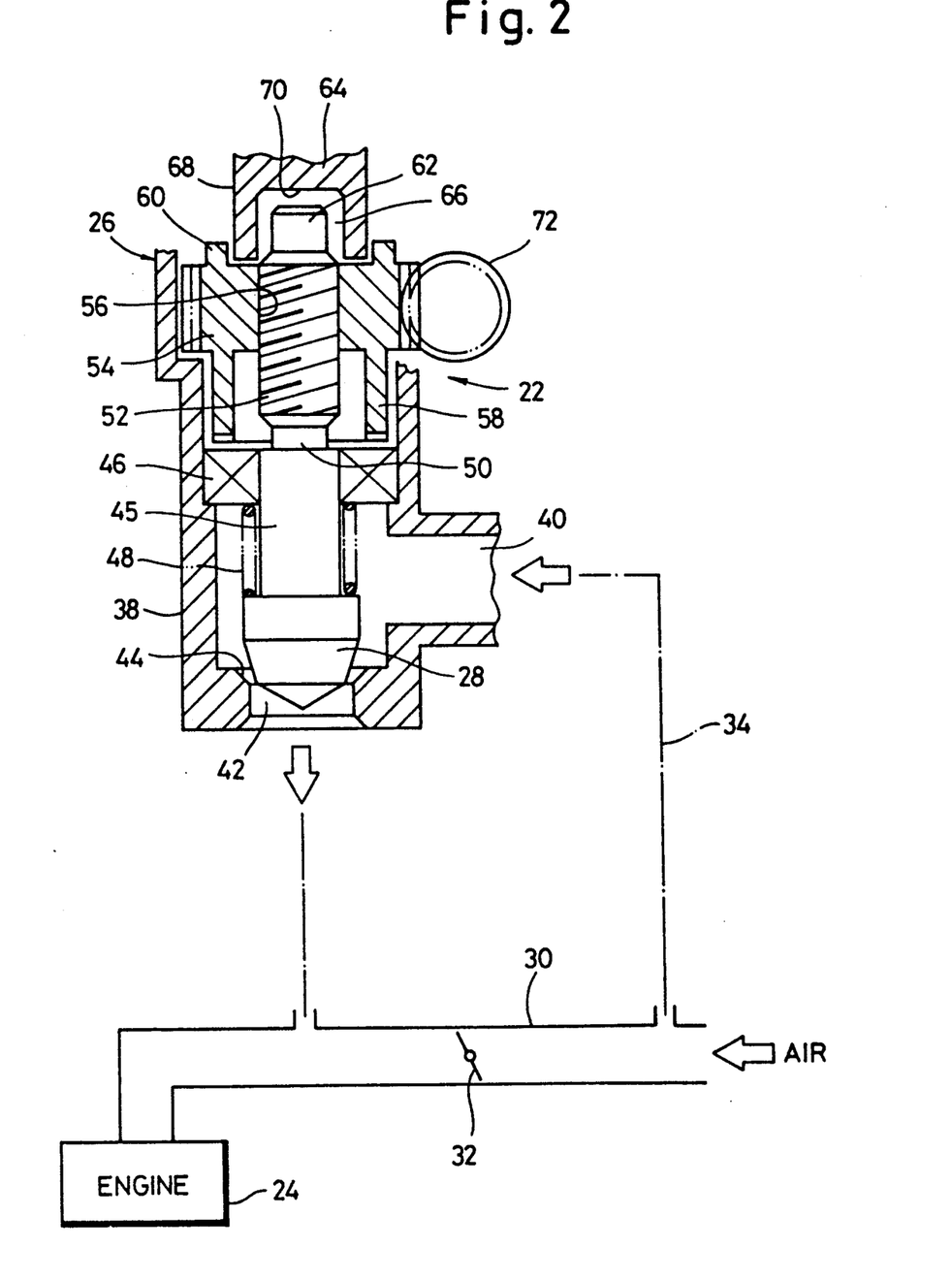
FIG. 2 is a sectional view showing part of an idle speed control valve for a vehicle, to which the sensor of FIG. 1 is applied.
Figure 3:
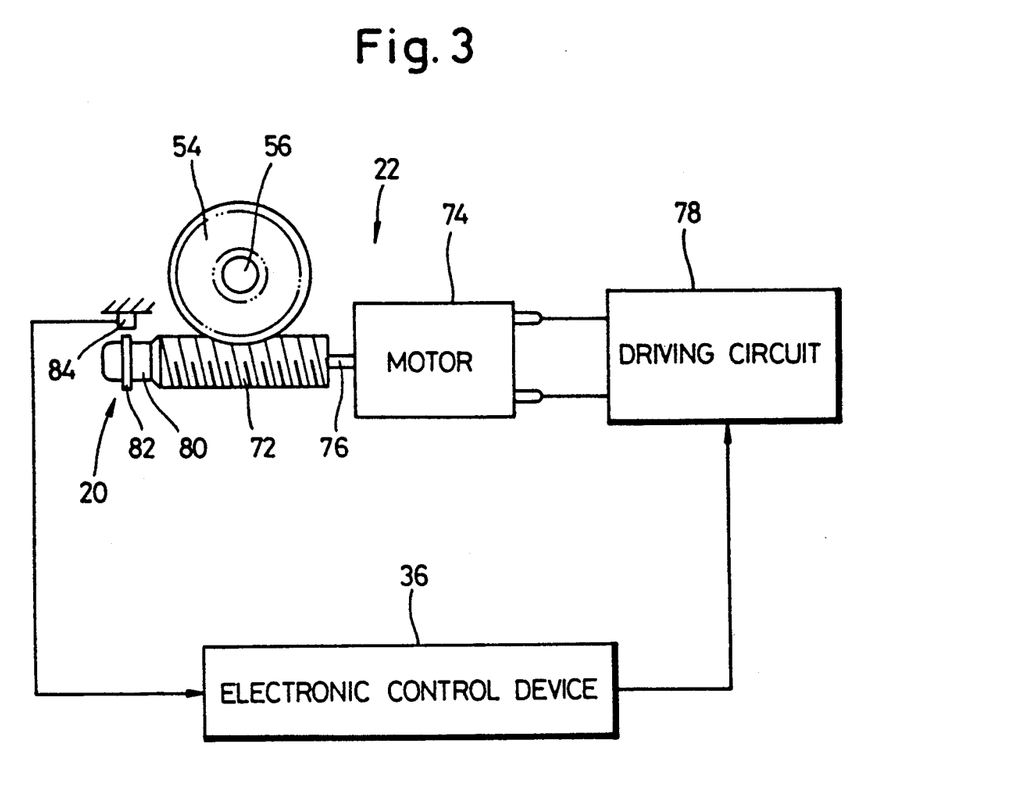
FIG. 3 is a diagram showing an arrangement of a motor-driven actuator into which the sensor of FIG. 1 is incorporated.

A sensor 20 for detecting a number of revolutions, shown in FIG. 1, is incorporated into a motor-driven actuator 22 in FIGS. 2 and 3. The motor-driven actuator 2 of this embodiment is used to drive a control valve for controlling the idle speed of an engine 24 of a motor vehicle, i.e., to drive a valve member 28 of an idle speed control valve (hereinafter merely referred to as ISCV) 26.

First, the ISCV 26 will be briefly described. An intake manifold 30 of the engine 24 is provided with a bypass passage 34 which bypasses a throttle valve 32 arranged in the intake manifold 30, and the above-mentioned ISCV 26 is arranged in the bypass passage 34. When the engine 24 is running idle, an electronic control device 36 shown in FIG. 3 drives the valve member 28 of the ISCV 26 through the motor-driven actuator 22, whereby the sectional flow area of the bypass passage 34 can be changed by the motor-driven actuator 22. Accordingly, by changing the valve opening of the valve member 28 of the ISCV 26, the amount of a mixture supplied to the engine 24 through the bypass passage 34 can be adjusted, and in accordance with this adjustment, the idle speed of the engine 24 is controlled to be equal to a desired idle speed which is set in accordance with operating conditions of the engine 24.

The desired idle speed is varied in accordance with the temperature of cooling water of the engine 24. In the case of a motor vehicle equipped with an air conditioner, an automatic transmission, a hydraulic pump for power steering, etc., the desired idle speed is varied also in accordance with the on/off states of the air conditioner, change-speed ranges of the automatic transmission, and on/off states of the hydraulic pump, etc.

The ISCV 26 has a housing 38, only a lower part of which is shown in FIG. 2. The lower part of the housing 38 has a hollow cylindrical shape, and has an inlet port 40 formed in the side wall thereof and connected to an upstream portion of the bypass passage 34. An outlet port 42 is formed in the bottom wall of the lower part of the housing 38 and connected to a downstream portion of the bypass passage 34.

An inner peripheral edge of the outlet port 42 is formed to function as a valve seat 44 in cooperation with the valve member 28. A valve shaft 45 extends upward from the valve member 28 and is axially movably supported by a bearing 46 secured within the housing 38. A valve spring 48, formed by a compression spring, is arranged between the bearing 46 and the valve member 28 so as to surround the valve shaft 45. The valve spring 48 serves to push the valve member 28 toward the valve seat 44. Accordingly, the valve member 28 is normally seated on the valve seat 44 due to the force exerted by the valve spring 48, whereby the outlet port 42 is closed in a normal state.

The valve member 28 of the ISCV 26 is adapted to be driven by the motor-driven actuator 22, as mentioned above. Now, the motor-driven actuator 22 will be described.

The motor-driven actuator 22 includes a feed screw 52 having a neck portion 50 at a lower end thereof and extending upward from the upper end of the valve shaft 45. The feed screw 52 extends coaxially with and upward from the valve shaft 45, and a worm wheel 54 which is rotatably arranged in the housing 38 is disposed in mesh with the feed screw 52. Specifically, the worm wheel 54 has a threaded hole 56 bored through a central portion thereof, and the feed screw 52 is screwed in the threaded hole 56 to the opposite side of the worm wheel 54. Axial movement of the worm wheel 54 is prohibited by suitable fixing means, not shown.

A ring-shaped cover 58 extends from an end face of the worm wheel 54 closer to the bearing 46, i.e., from the lower surface of the worm wheel 54, approximately to the bearing 46, to surround the feed screw 52. An annular rim 60 projects from the upper surface of the worm wheel 54 and surrounds an upper end portion 62 of the feed screw 52 projecting from the upper surface of the worm wheel 54. Above the worm wheel 54 is provided a cylindrical stopper 64 which is arranged coaxially with the feed screw 52. The stopper 64 has an annular portion 68 at a lower part thereof, which defines a cylindrical recess 66 having a diameter slightly larger than that of the feed screw 52. The lower edge of the annular portion 68 is inserted between the rim 60 of the worm wheel 54 and the upper end portion 62 of the feed screw 52, thereby surrounding the upper end portion 62.

The bottom surface of the recess 66 of the stopper 64 functions as a stopper surface 70 for regulating the upper limit of axial movement of the feed screw 52, i.e., the distance by which the valve member 28 is spaced from the valve seat 44. Namely, the stopper surface 70 determines the maximum opening defined by the valve member 28.

The worm wheel 54 meshes with a worm gear 72 made of a non-magnetic material. As shown in FIG. 3, the worm gear 72 extends in a direction perpendicular to the axis of the worm wheel 54 and is coupled at one end to an output shaft 76 of a motor 74 which is capable of forward and reverse rotations. The motor 74 used in this embodiment is an ordinary DC motor having a brush. This type motor is inexpensive and has the advantage that the characteristics thereof change little when heated due to an increase of ambient temperature.

The motor 74 is electrically connected to a driving circuit 78, which in turn is connected to the aforementioned electronic control device 36.

Although not illustrated in detail, the motor 74 and the worm gear 72 are contained in the aforesaid housing 38.

According to the motor-driven actuator 22 described above, the motor 74 is rotated forward or reversely by the driving circuit 78, in accordance with a drive signal supplied to the circuit 78 from the electronic control device 36. The rotating force of the motor 74 is transmitted to the worm wheel 54 through the worm gear 72, thereby rotating the worm wheel 54. Since axial movement of the worm wheel 54 is prohibited, the rotation of the worm wheel 54 is converted into axial movement of the feed screw 52. As the feed screw 52 is axially moved, the valve member 28 of the ISCV 26 is moved by the neck portion 50 and the valve shaft 45 in a direction toward or away from the valve seat 44. Namely, the valve opening of the valve member 28 is changed.

Thus, while the engine 24 of the vehicle is running idle, the valve opening of the valve member 28 of the ISCV 26 is varied by the motor-driven actuator 22 to adjust the amount of a mixture supplied to the engine 24 through the aforesaid bypass passage 34, whereby the rotational speed of the engine 24 during idling operation can be controlled.

The above idle speed control is carried out such that the actual idle speed coincides with a desired idle speed suited to the condition in which the engine 24 is then operated. To this end, the opening of the valve member 28 of the ISCV 26 must be controlled in accordance with the deviation between the desired idle speed and the actual idle speed. The opening of the valve member 28, i.e., the axial position of the same, can be obtained by counting the number of revolutions of the motor 74 of the motor-driven actuator 22, and therefore, according to the present invention, the sensor 20 for detecting a number of revolutions is incorporated into the motor-driven actuator 74, as stated at the beginning of the description of this embodiment.

Figure 4:
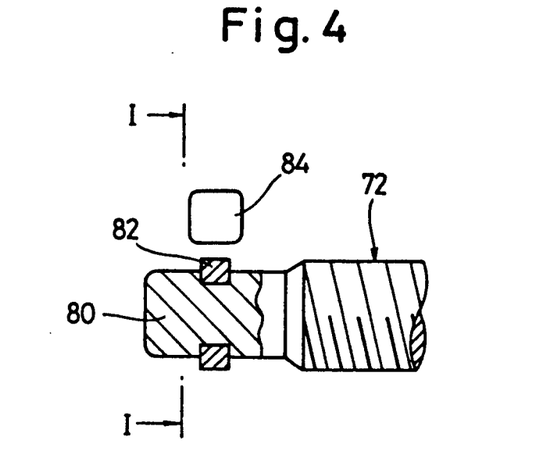
FIG. 4 is an enlarged view of part of the actuator of FIG. 3, showing the arrangement of the sensor relative to the actuator.

The sensor 20 is arranged at the distal end-side of the worm gear 72, as clearly shown in FIG. 3 taken in connection with FIGS. 1 and 4. Specifically, the worm gear 72 has a rotary shaft portion 80 at the distal end thereof, which portion rotates together with the worm gear 72 and the number of rotations of which is detected, and a ring magnet 82 is attached to the rotary shaft portion 80. The ring magnet 82 is secured to the rotary shaft portion 80, whereby the ring magnet 82 is rotated together with the rotary shaft portion 80. The ring magnet 80 is magnetized such that one circumferential half of the outer peripheral surface thereof serves as the north pole and the other circumferential half serves as the south pole, as shown in FIG. 1. In FIG. 1, the boundaries between different polarity regions of the ring magnet 82 are indicated by the broken line for clarification.

A Hall IC 84 serving as a magnetic probe is secured to the housing 38 near the outer peripheral surface of the rotary shaft portion 80, such that it always faces the outer peripheral surface of the ring magnet 82.

When a magnetic pole at the outer peripheral surface of the ring magnet 82, e.g., the north pole, passes just under the Hall IC 84 while the ring magnet 82 is rotated together with the rotary shaft portion 80, the Hall IC 84 outputs a voltage signal of high (H) level, and when the south pole of the ring magnet 82 passes just under the Hall IC 84, the Hall IC 84 outputs a voltage signal of low (L) level.

Figure 5:
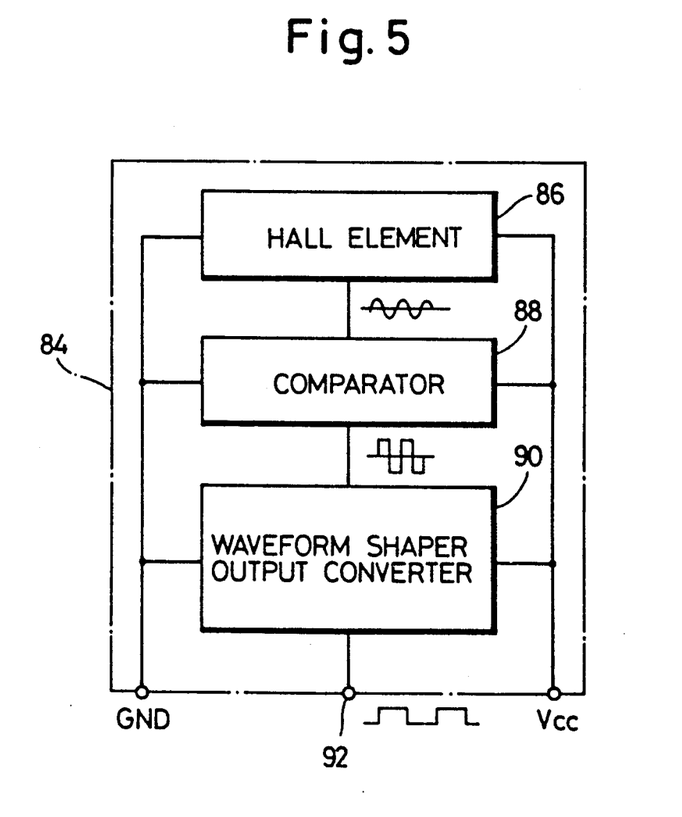
FIG. 5 is a block diagram showing an arrangement of a Hall element included in the sensor of FIG. 1.

As shown in FIG. 5, the Hall IC 84 includes a Hall element 86, which detects magnetism of the ring magnet 82 and outputs an analog signal in accordance with the detected magnetism. The analog signal from the Hall element 86 is input to a comparator 88, which outputs an H level voltage signal when the level of the received analog signal is higher than the H slice level, and outputs an L level voltage signal when the level of the received analog signal is lower than the L slice level. Accordingly, the output signal of the comparator 88 forms a pulse signal P, which is subjected to waveform shaping by a waveform shaper/output converter 90 and then output from an output terminal 92 of the Hall IC 84. The pulse signal P obtained at this stage contains an H level component PH and an L level component PL. The output terminal 92 is connected to the electronic control device 36, as shown in FIG. 3, whereby the pulse signal from the Hall IC 84 is supplied to the electronic control device 36. In FIG. 5, the output waveforms of the Hall element 86, comparator 88 and waveform shaper/output converter 90 are symbolically illustrated, and symbols Vcc and GND represent a power supply terminal and a grounding terminal, respectively.

Figure 6:
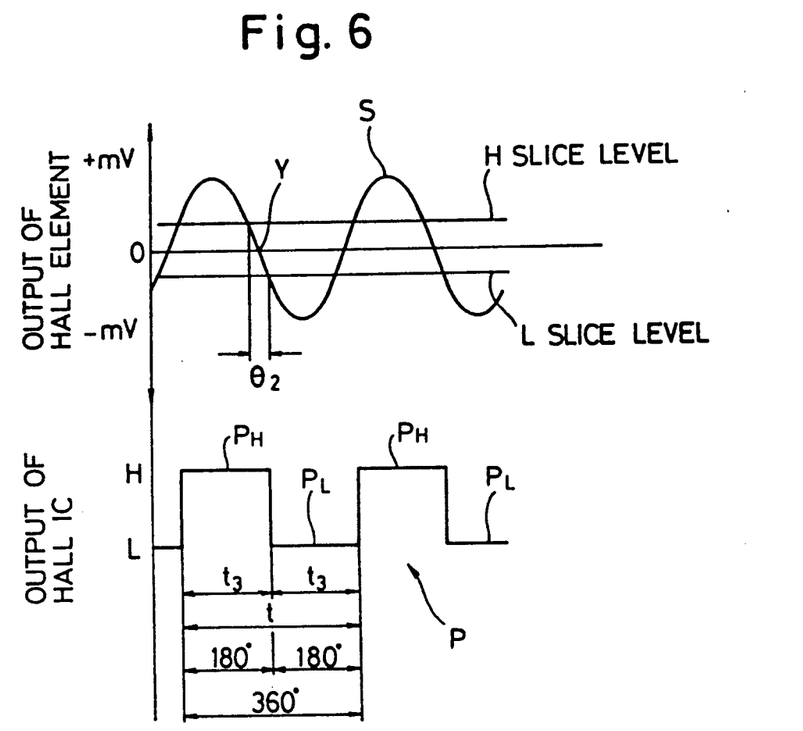
FIG. 6 is a chart showing an output of the Hall element within a Hall IC and an output of the Hall IC.

According to the above-described sensor 20, as the ring magnet 82 is rotated together with the rotary shaft portion 80 by the motor 74, the Hall element 86 of the Hall IC 84 alternately detects the magnetism of different pole each time the ring magnet 82 makes a half rotation. Thus, the Hall element 86 outputs an analog signal S of near sine wave, as shown in FIG. 6. The analog signal S output from the Hall element 86 is converted into the pulse signal P, also shown in FIG. 6, by the comparator 88 and the waveform shaper/output converter 90, as mentioned above, and supplied to the electronic control device 36 from the Hall IC 84. The H level component PH and L level component PL of the pulse signal P supplied to the electronic control device 36 are counted by counters within the electronic control device 36, in such a manner that their count values are counted up or down in the counters depending on whether the motor 74 is rotated in a forward or reverse direction. Accordingly, the valve opening of the valve member 28 of the ISCV 26 can be obtained from these count values, namely, from the number of revolutions of the motor 74.

In the sensor 20 of the invention, the ring magnet 82 is magnetized such that one circumferential half of the outer peripheral surface thereof serves as the north pole and the other circumferential half serves as the south pole. Therefore, when the rotary shaft portion 80 is rotated, the Hall element 86 of the Hall IC 84 outputs an analog signal S having a near sine wave, as mentioned above and shown in FIG. 6, whereby a large hysteresis angle $\theta 2$ (about 30°) is ensured in comparison with the hysteresis angle $\theta 1$ of the prior art shown in FIG. 14. Thus, when the rotation of the motor 74 is stopped and the ring magnet 82 is located in a rotational position as shown in FIG. 1, namely, in such a position that a boundary X of magnetic poles of the ring magnet 82 is opposed to the Hall IC 84, the voltage signal S from the Hall element 86 of the Hall IC 84 has a level intermediate between the H and L slice levels, as indicated by point Y in FIG. 6. While in this state, even if the rotational angle of the rotary shaft portion 80, i.e., the ring magnet 82, fluctuates due to vibration etc. of the rotary shaft portion 80, such fluctuation never exceeds $(\frac{1}{2})\theta 2$, whereby level changes in the voltage signal S from the Hall element 86 due to the fluctuation can be restricted to within the range between the H and L slice levels. Accordingly, it is possible to prevent a pulse signal P that incurs erroneous counting of the counters in the electronic control device, i.e., a chattering pulse signal P, from being output from the Hall IC 84.

When the rotary shaft portion 80 is stopped and the boundary X of the ring magnet 82 is located at a rotational position deviated from the position shown in FIG. 1 such that the output level of the voltage signal S from the Hall IC 84 is close to the H or L slice level, no chattering occurs in the pulse signal P from the Hall IC 84 even if vibration etc. of the rotary shaft portion 80 occurs. Namely, in this case, period t3 of the H level component PH or L level component PL of the pulse signal P merely lengthens, and accordingly, it is possible to prevent a pulse signal P that incurs erroneous counting of the counters in the electronic control device, i.e., a chattering pulse signal P, from being output from the Hall IC 84.

According to the sensor 20 of the invention, when the rotary shaft portion 80 is rotated at a constant speed, the periods of the H level component PH and L level component PL of the pulse signal P are equal, namely, period t3, as is clear from FIG. 6, and this period t3 is much longer than the period t2 of the prior art case shown in FIG. 14, thus enabling the detection of the period t3. Therefore, even if a fluctuation in rotational angle of the rotary shaft portion 80 is so large that chattering occurs in the pulse signal P from the Hall IC 84, such chattering can be easily eliminated by filtering the pulse signal P taking account of the rotational speed of the motor 74, such that those pulse signals P whose pulse interval t1 is improbably short or long are neglected and thus are not counted.

Obviously, the above filtering can function effectively in the case in which the voltage signal S from the Hall element 86 can be adversely influenced by external electromagnetic noise from a broadcasting station, communication system, etc.

As described above, the sensor 20 of this invention can accurately count the number of revolutions of the rotary shaft portion 80 with a simple arrangement, and, by incorporating this sensor 20 into the motor-driven actuator 22 of the aforesaid ISCV 26, it is possible to detect and control the valve opening of the valve member 28 of the ISVC 26 with high accuracy.

When the opening of the valve member 28 need be detected further accurately, the counters in the electronic control device are reset, with the upper end portion 62 of the feed screw 52 of the ISCV 26 held in contact with the stopper 64, and the number of revolutions of the rotary shaft portion 80 is counted while moving the feed screw 52 from the contact position.

If the number of teeth of the worm wheel 54 is increased as many as possible and the pitch of the feed screw 52 is decreased, the valve opening of the valve member can of course be detected and controlled with higher accuracy.

The present invention is not limited to the first embodiment described above, and a modification of the invention is possible as shown in FIGS. 7 to 12.

Figure 7:
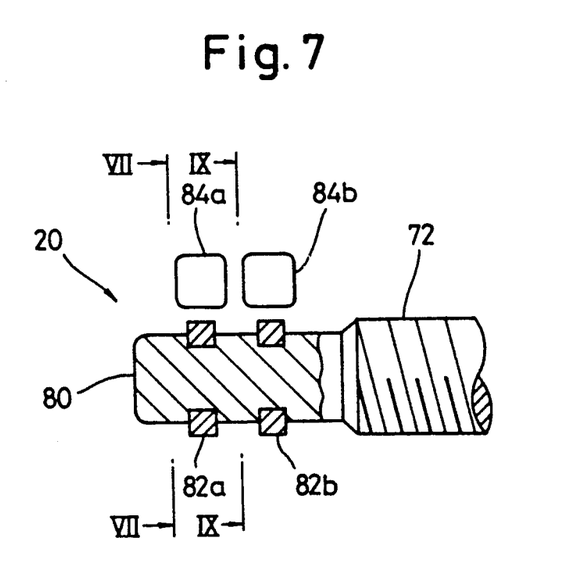
FIG. 7 is a diagram showing a modified arrangement of a sensor according to the invention.
Figure 8:
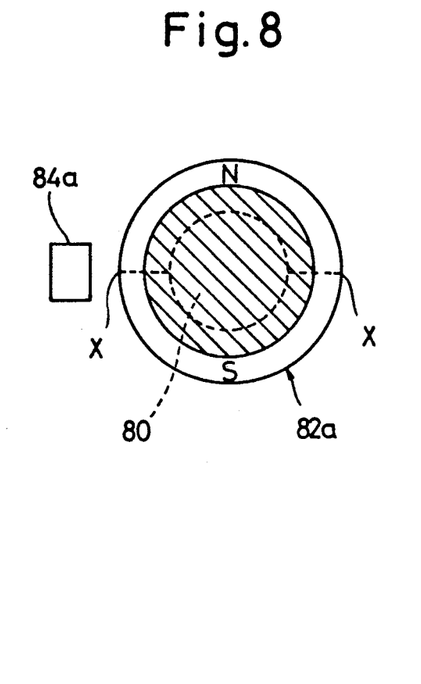
FIG. 8 is a sectional view taken along line VIII—VIII in FIG. 7.
Figure 9:
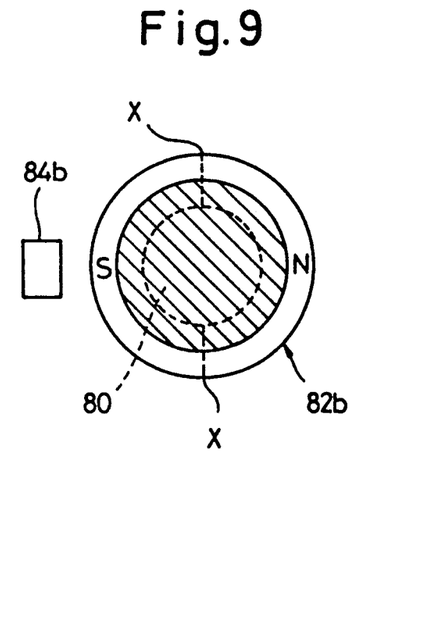
FIG. 9 is a sectional view taken along line IX—IX in FIG. 7.

In this modification, as seen from FIG. 7, the sensor 20 comprises first and second ring magnets 82a and 82b, and first and second Hall ICs 84a and 84b associated with a pair of first and second ring magnets 82a and 82b, respectively. The first and second ring magnets 82a and 82b and the first and second Hall ICs 84a and 84b are equivalent to the corresponding elements in the first embodiment, and accordingly, description thereof is omitted. In this modified arrangement, however, the first and second ring magnets 82a and 82b are attached to the rotary shaft portion 80 such that they are shifted in rotational phase by 90° relative to each other.

Figure 10:
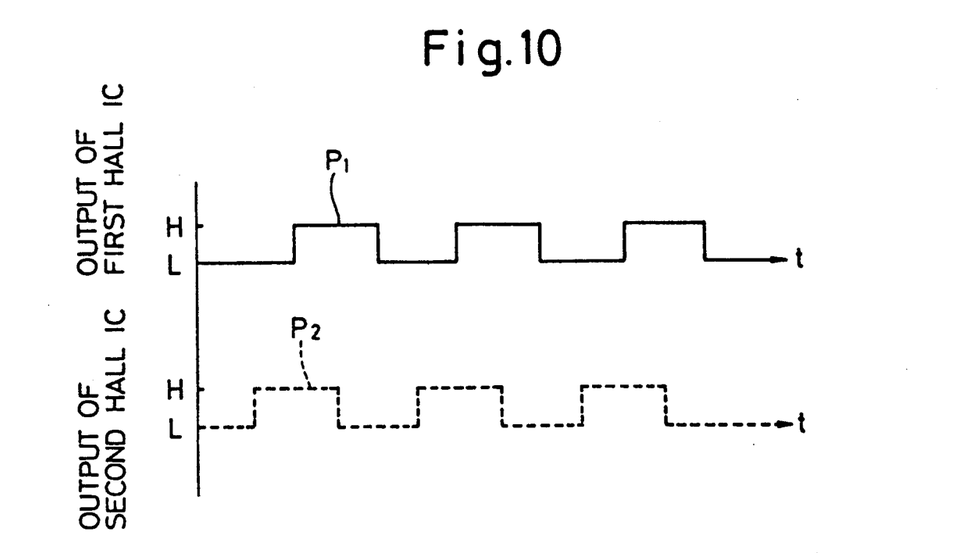
FIG. 10 is a chart showing outputs of Hall ICs in the sensor of FIG. 7.

According to the sensor 20 of the modified arrangement, as the rotary shaft portion 80 rotates, the first and second Hall ICs 84a and 84b output first and second pulse signals P1 and P2, respectively, as shown in FIG. 10, due to the aforesaid phase difference 90°.

Figure 11:
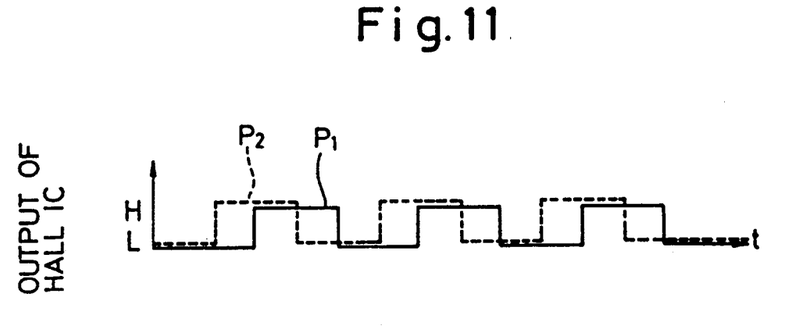
FIGS. 11 and 12 are charts showing the outputs of the Hall ICs of FIG. 10 in a manner superposed one on the other.

Thus, by taking together the first and second pulse signals P1 and P2 shown in FIG. 10 as if they are superposed one upon the other, it is possible to determine whether the rotary shaft portion 80 is rotating in a forward or reverse direction. Let it be assumed that, when the rotary shaft portion 80 is rotating in the forward direction, a superposed pattern shown in FIG. 11 is obtained by superposing the first and second pulse signals P1 and P2. In this case, when the first pulse signal P1 from the first Hall IC 84a maintains H level, the second pulse signal P2 from the second Hall IC 84b changes from H level to L level.

Figure 12:
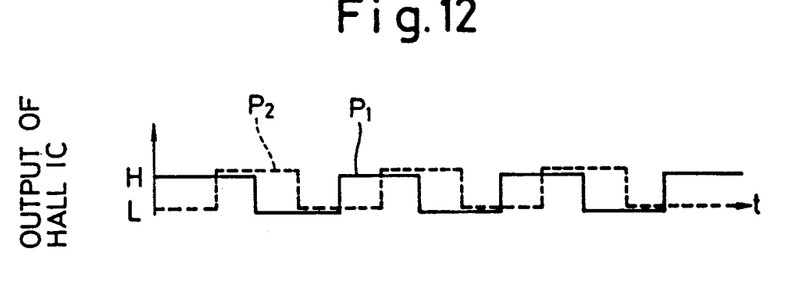

When the rotary shaft portion 80 is rotating reversely, in contrast, a superposed pattern shown in FIG. 12 is obtained by superposing the pulse signals from the first and second Hall ICs 84a and 84b. In this case, as is clear from FIG. 12, while the first pulse signal P1 from the first Hall IC 84a maintains H level, the second pulse signal P2 from the second Hall Ic 84b changes from L level to H level.

Thus, in this modified arrangement, whether the rotary shaft portion 80, i.e., the motor 74, is rotating in the forward or reverse direction can be detected by discriminating between the patterns of FIGS. 11 and 12, obtained by superposing the pulse signals from the first and second Hall ICS 84a and 84b, by means of the electronic control device 36.

In the above-described embodiment and modification, a Hall IC is used as the magnetic probe, but a magnetic probe of electronic induction type may alternatively be used.

Further, the sensor for detecting a number of revolutions, according to the invention, is not limited in application to the aformentioned ISCV, and it can of course be used to detect a number of revolutions of a rotating member included in various types of apparatuses.

What is claimed is:

1. A detector device for detecting a number of revolutions of a rotating member which is rotated in forward and reverse directions, comprising:

a signal generating member arranged around an outer peripheral surface of the rotating member, the signal generating member having an outer peripheral surface, and first and second reference boundaries defined on the outer peripheral surface thereof and dividing same into two regions adjacent to each in a circumferential direction thereof for generating first and second signals with different properties;

detecting means securely arranged in the vicinity of the signal generating member and having a receiving section for receiving the first and second signals when corresponding ones of the two regions are close thereto, the detecting means providing a binary signal with an output level corresponding to the first or second signal when the receiving section is receiving the first or second signal, respectively, the output level of the binary signal being inverted every time each of the first and second reference boundaries of the signal generating member passes by the receiving section;

signal producing means for producing a discrimination signal which is shifted in phase from the binary signal output from the detecting means, during rotation of the rotating member; and counter means, which receives the binary signal from the detecting means and the discrimination signal from the signal producing means, and including a counter means for counting the number of revolutions of the rotating member, the counter means determining a direction of rotation of the rotating member by a logic operation based on changes in the binary signal and in the discrimination signal, and incrementing or decrementing a value of the counter means from an initial value thereof in accordance with direction of rotation of the rotating member ever time the output level of the binary signal is inverted.

2. The detector device according to claim 1, wherein:

said signal generating member includes a first ring member attached to the outer peripheral surface of the rotating member, the first ring member having a north pole region extending over one circumferential portion of an outer peripheral surface thereof and a south pole region extending over another circumferential portion of the outer peripheral surface thereof, the first and second reference boundaries being defined as boundaries between the north pole region and the south pole region; and said receiving section of the detecting means comprising a first magnetic probe for detecting polarities of the north and south pole regions of the first ring member when opposed thereto, and outputting the binary signal in accordance with the detected polarities.

3. The detector device according to claim 2, wherein said first ring member comprises a ring magnet having one circumferential half of the outer peripheral surface thereof magnetized to serve as the north pole region, and the other circumferential half of the outer peripheral surfaces thereof magnetized to serve as the south pole region.

4. The detector device according to claim 2, wherein said first magnetic probe includes an integrated circuit having a Hall element providing a signal in accordance with polarities of the first ring magnet when the first ring magnet is rotated.

5. The detector device according to claim 4, wherein said integrated circuit further includes a comparator for converting the signal into a binary pulse signal, and means for shaping the waveform of the binary pulse signal and providing a shaped binary pulse signal.

6. The detector device according to claim 2, wherein:

said signal producing means include a second ring member attached to the outer peripheral surface of the rotating member, located adjacent to the first ring member at a predetermined distance therefrom, the second ring member having substantially the same shape as the first ring member, and the second ring member having a north pole region extending over one circumferential portion of an outer peripheral surface thereof and a south pole region extending over another circumferential portion of the outer peripheral surface thereof, the north pole region and south pole region of the second ring member being shifted in rotational phase by a predetermined number of degree in the circumferential direction of the rotating member from corresponding ones of the north pole region and south pole region of the first ring member; and said receiving section of the detecting means further comprising:

a second magnetic probe securely arranged in a side-by-side relation to the first magnetic probe, the second magnetic probe being located close to the peripheral surface of the second ring member.

7. A detector device according to claim 6, wherein said circumferential portions of said second ring member are circumferential half portions.

8. A detector device according to claim 6, wherein said circumferential portions of said first ring member are circumferential half portions.

9. A detector device according to claim 2, wherein said circumferential portions of said first ring member are circumferential half portions.

10. A detector device according to claim 6, wherein:
said circumferential portions of said first ring member are circumferential half portions;
said circumferential portions of said second ring member are circumferential half portions; and
said predetermined number of degrees is 90°.

11. A detector device for detecting a number of revolutions of a rotating member which is rotated in forward and reverse directions, comprising:

a magnet assembly arranged around an outer peripheral surface of the rotating member, the magnet assembly including first and second ring magnets securely arranged and surrounding the outer peripheral surface of the rotating member, the first and second ring magnets each having a north pole region magnetized to be a north magnetic pole and extending over one circumferential portion of an outer peripheral surface thereof and a south pole region magnetized to be a south magnetic pole and extending over another circumferential portion of the outer peripheral surface thereof, the north and south pole regions of the first ring magnet being shifted in rotational phase by a predetermined number of degrees in a circumferential direction of the rotating member from the north and south pole regions of the second ring magnet, respectively.

magnetism detecting means for detecting changes in polarity caused by movement of the north and south pole regions of the first and second ring magnets, at a predetermined circumferential positon relative to the circumfential direction of the rotating member when the first and second ring magnets are rotated together with the rotating member, and for outputting a result of the detection, the magnetism detecting means including a first magnetic probe securely arranged in the vicinity of the outer peripheral surface of the first ring magnet and always opposed to same, and a second magnetic probe securely arranged in the vicinity of the outer peripheral surface of the second ring magnet and always opposed to same, the first magnetic probe outputting a binary signal of a different level depending on whether it is opposed on the north or south pole region of the first ring magnet, the second magnetic probe being located at the same circumferential position as the first magnetic probe with respect to the circumferential direction of the rotating member, and outputting a binary signal of a different level depending on whether it is opposed to the north or south pole region of the second ring magnet; and measuring means for counting the number of revolutions of the rotating member based on a reference angualr position thereof, in accordance with the outputs of the first and second magnetic probes, the measuring means including a counter, a value of which is incremented or decremented from an initial value thereof every time the output level of the binary signal from at least one of the first and second magnetic probes is inverted, the incrementing or decrementing of the counter being determined by a logical operation based a direction of inversion of the output level of the binary signal from one magnetic probe and the output level of the binary signal from the other magnetic probe.

12. The detector device of claim 11, wherein said circumferential portion of at least one of said first and second ring magnets comprises a circumferential half of the outer peripheral surface thereof.

13. The detector device of claim 12, wherein said circumferential portion of each of said first and second ring magnets comprises a circumferential half of the outer peripheral surface thereof; and said predetermined number of degrees is 90°.

14. A sensor for detecting direction and number of revolutions of a rotating member which is rotated in forward and reverse directions, comprising:

a magnetic assembly arranged around an outer peripheral surface of the rotating member, the magnet assembly including first and second ring magnets of identical shape, securely arranged and surrounding the outer peripheral surface of the rotating member and spaced apart from each other at a predetermined distance in an axial direction of the rotating member, the first and second ring magnets each having a north pole region magnetized to be a north magnetic pole and extending over one circumferential portion of an outer peripheral surface thereof and a south pole region magnetized to be a south magnetic pole and extending over another circumferential portion of the other peripheral surface thereof, the north and south pole regions of the first ring magnet being shifted in rotational phase by a predetermined number of degrees in a circumferential direction of the rotating member from the north and south pole regions of the second ring magnet, respectively; and magnetism detecting means for detecting changes in polarity caused by movement of the north and south pole regions of the first and second ring magnets, at a predetermined circumferential position relative to the circumferential direction of the rotating member when the first and second ring magnets are rotated together with the rotating member, and for outputting a result of the detection, the magnetism detecting means including a first magnetic probe securely arranged in the vicinity of the outer peripheral surface of the first ring magnet and always opposed to same, and a second magnetic probe securely arranged in the vicinity of the outer peripheral surface of the second ring magnet and always opposed to same, the first magnetic probe outputting a binary signal of a different level depending on whether it is opposed to the north or south pole region of the first ring magnet, the second magnetic probe being located at the same circumferential position as the first magnetic probe with respect to the circumferential direction of the rotating member, and outputting a binary siganl of a different level depending on whether it is opposed to the north or south region of the second ring magnet.

15. The detector device of claim 14, wherein said circumferential portion of at least one of said first and second ring magnets comprises a circumferential half of the outer peripheral surface thereof.

16. The detector device of claim 15, wherein said circumferential portion of each of said first and second ring magnets comprises a circumferential half of the outer peripheral surface thereof; and said predetermined number of degrees is 90°.

17. A motor-driven actuator for driving a driven member, comprising;
an electric motor continuously driven in a forward or reverse direction;
a gear train for transmitting rotation of the electric motor to the driven member while converting the rotation of the motor to reciprocating motion of the driven member; and
a sensor for detecting direction and number of rotations of a rotary member which includes at least one rotary shaft included in at least one of the gear train and an output shaft of the motor, the sensor including:
a magnet assembly arranged around an outer peripheral surface of one of the rotary shafts and the output shaft, the magnet assembly including first and second ring magnets of identical shape, securely arranged and surrounding the puter peripheral surface of the rotating member and spaced apart from each other at a predetermined distance in an axial direction of the rotating member, the first and second ring magnets each having a north pole region magnetized to north pole and extending over one circumferential portion of an outer peripheral surface thereof and a south pole region magnetized to be a south magnetic pole and extending over another circumferential portion of the outer pheripheral surface thereof, the north and south pole regions of the first ring magnetic being shifted in rotational phase by a predetermined number of degrees in a circumferential direction of the rotating member from the north and south pole regions of the second ring magnet, respectively; and magnetism detecting means for detecting changes in polarity caused by movement of the north and south pole regions of the first and second ring magnets, at a predetermined circumferential position relative to the circumferential direction of the rotating member when the first and second ring magnets are rotated together with the rotating member, and for outputting a result of the detection, the magnetism detecting means including a first magnetic probe securely arranged in the vicinity of the outer peripheral surface of the first ring magnet and always opposed to same, and a second magnetic probe securely arranged in the vicinity of the outer peripheral surface of the second ring magnet and always opposed to same, the first magnetic probe outputting a binary signal of a different level depending on whether it is opposed to the north or south pole region of the first magnet, the second magnetic probe being located at the same circumferential position as the first probe with respect to the circumferential direction of the rotating member, and outputting a binary signal of a different level depending on whether it is opposed to the north or south pole region of the second ring magnet.

18. The motor-driven actuator according to claim 17, wherein said first and second ring members each comprise a ring magnet, each of the ring magnets having one circumferential half of the outer peripheral surface thereof magnetized to serve as the north pole region, and the other circumferential half of the outer peripheral surface thereof magnetize to serve as the south pole region.

19. The motor-driven actuator according to claim 17, wherein each of said first and second magnetic probes includes an integrated circuit having a Hall element, said Hall element provinding a signal in accordance with polarities of the ring magnet associated therewith when the associated ring magnet rotates.

20. The motor-driven actuator according to claim 19, wherein said integrates circuit further includes a comparator for converting the signal into a binary pulse signal, and means for shaping the waveform of the binary pulse signal and providing a shaped binary pulse signal.

21. The detector device of claim 17, wherein said circumferential portion of at least one of said first and second ring magnets comprises a circumferential half of the outer peripheral surface thereof.

22. The detector device of claim 21, wherein said circumferential portion of each of said first and second ring magnets comprises a circumferential half of the outer peripheral surface thereof; and said predetermined number of degrees is 90°.

* * * * *